(12) United States Patent
Fujita

(10) Patent No.: US 11,689,800 B2
(45) Date of Patent: Jun. 27, 2023

(54) IMAGE CAPTURING APPARATUS AND METHOD OF CONTROLLING THE SAME, AND STORAGE MEDIUM

(71) Applicant: CANON KABUSHIKI KAISHA, Tokyo (JP)

(72) Inventor: Shunji Fujita, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/739,521

(22) Filed: May 9, 2022

(65) Prior Publication Data

US 2022/0368827 A1 Nov. 17, 2022

(30) Foreign Application Priority Data

May 13, 2021 (JP) ................. 2021-081834

(51) Int. Cl.
*H04N 23/60* (2023.01)
*H04N 23/63* (2023.01)
(52) U.S. Cl.
CPC ........... *H04N 23/64* (2023.01); *H04N 23/633* (2023.01)

(58) Field of Classification Search
CPC ........... H04N 5/23293; H04N 5/23212; H04N 5/23216; H04N 5/23232; H04N 5/23222
See application file for complete search history.

(56) References Cited

U.S. PATENT DOCUMENTS

2016/0080639 A1\* 3/2016 Choi et al. ............. H04N 5/232
2021/0211575 A1\* 8/2021 Grant et al. ....... H04N 5/23216

FOREIGN PATENT DOCUMENTS

JP 2017-162438 A 9/2017

\* cited by examiner

*Primary Examiner* — Xi Wang
(74) *Attorney, Agent, or Firm* — Cowan, Liebowitz & Latman, P.C.

(57) ABSTRACT

An image capturing apparatus generates, by using an image of a first time point and being output from an image capturing unit, a prediction image predicting an image of a second time point in a future subsequent to the first time point. The apparatus determines, about the prediction image, a degree of suitability indicating a degree of the prediction image being suitable as an image to be recorded. The apparatus controls, in a case where the determined degree of suitability is higher than a predetermined threshold value, to capture an image upon reaching the second time point.

13 Claims, 7 Drawing Sheets

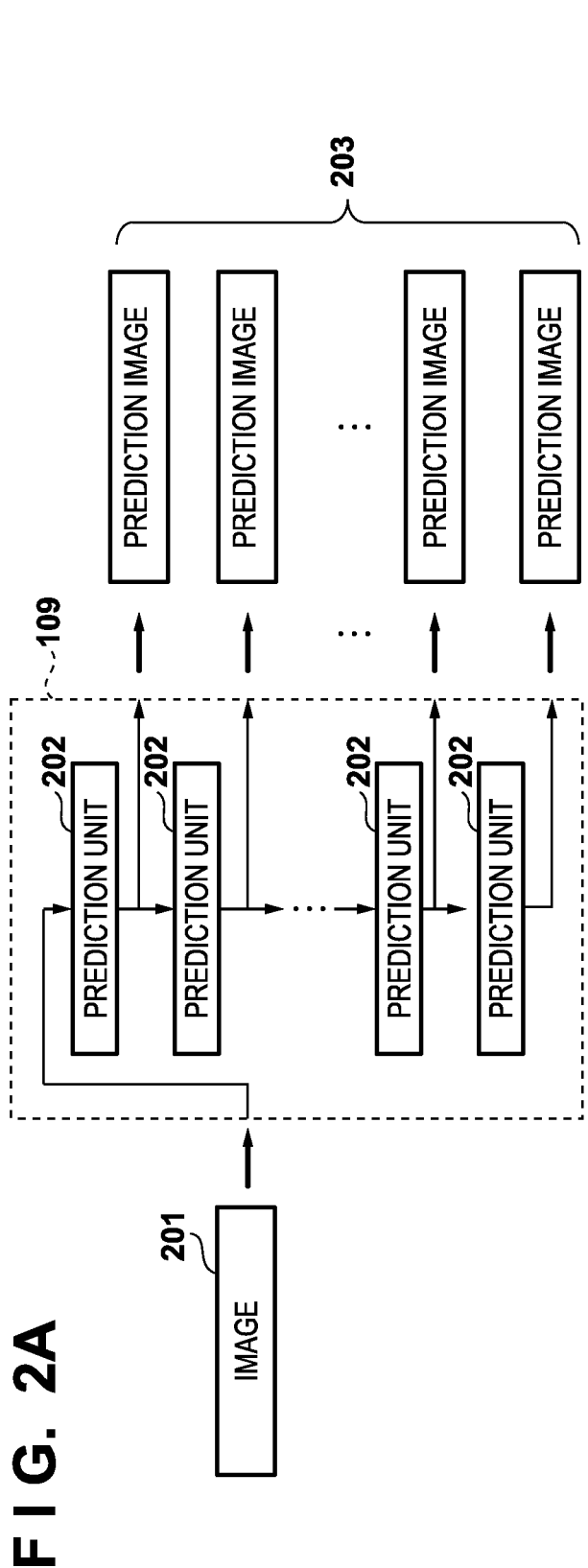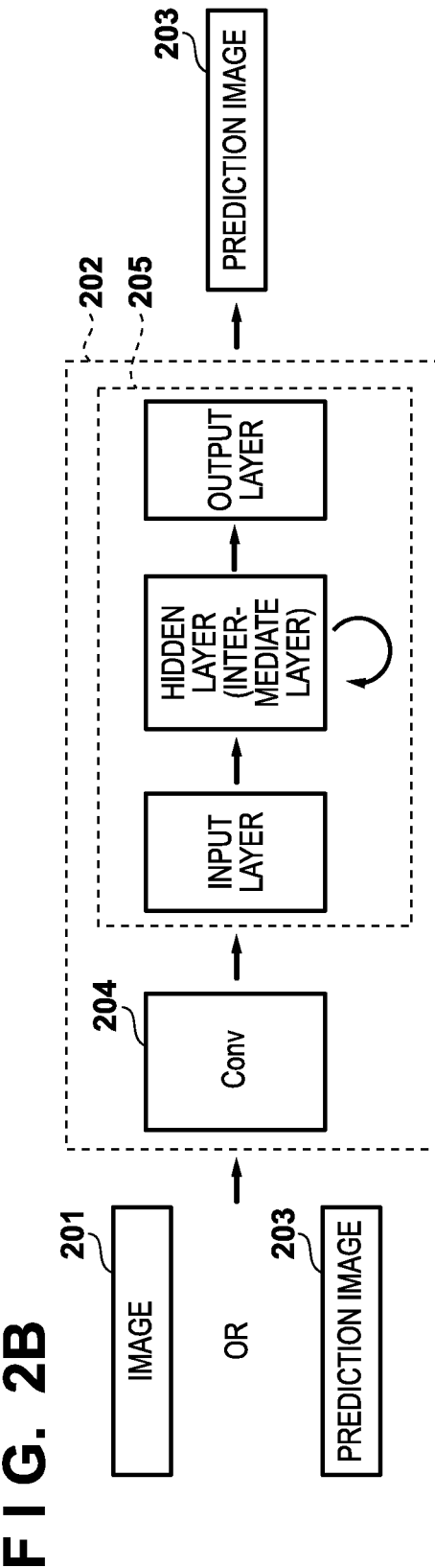

FIG. 6

| ID | PREDICTION IMAGE ID | SUITABILITY |
|---|---|---|
| 1 | $f_{t6}$ | 95% |
| 2 | $f_{t11}$ | 86% |
| 3 | $f_{t19}$ | 72% |

IMAGE CAPTURING APPARATUS AND METHOD OF CONTROLLING THE SAME, AND STORAGE MEDIUM

BACKGROUND OF THE INVENTION

Field of the Invention

The present invention relates to an image capturing apparatus and a method of controlling the same, and a storage medium.

Description of the Related Art

In recent years, development of image prediction technology using machine learning is being actively performed. Inputting a video shot by a camera to an inference model, which has been trained with a large amount of video data of a subject's behavior scene as training data, allows for predicting a future image of the subject. Japanese Patent Laid-Open No. 2017-162438 discloses a technique that inputs images shot by an on-vehicle camera to a trained convolutional neural network, and estimates a dangerous area and its features where a moving object may suddenly appear and collide while the camera-mounted vehicle keeps running.

Here, it is expected to provide a shooting assist function with an improved user-friendliness by applying, to the shooting assist function of cameras or smartphones, a technique for predicting a future image of the subject. For example, it is conceivable that executing automatic shooting with the shooting assist function of the camera or the smartphone at a suitable shooting timing in accordance with the change of the subject may improve user-friendliness. Although Japanese Patent Laid-Open No. 2017-162438 utilizes a technique of predicting a future image, it has not taken into account using the technique of shooting assist function.

SUMMARY OF THE INVENTION

The present disclosure has been made in consideration of the aforementioned issues, and realizes a technique that allows for automatically shooting at a suitable timing predicted from the current image.

In order to solve the aforementioned issues, one aspect of the present disclosure provides an image capturing apparatus comprising: a prediction unit configured to generate, by using an image of a first time point and being output from an image capturing unit, a prediction image predicting an image of a second time point in a future subsequent to the first time point; a determination unit configured to determine, about the prediction image, a degree of suitability indicating a degree of the prediction image being suitable as an image to be recorded; and a control unit configured to control, in a case where the determined degree of suitability is higher than a predetermined threshold value, the image capturing unit to capture an image upon reaching the second time point.

Another aspect of the present disclosure provides, a method of controlling an image capturing apparatus, the method comprising: predicting to generate, by using an image of a first time point and being output from an image capturing unit, a prediction image predicting an image of a second time point in a future subsequent to the first time point; determining, about the prediction image, a degree of suitability indicating a degree of the prediction image being suitable as an image to be recorded; and controlling, in a case where the determined degree of suitability is higher than a predetermined threshold value, the image capturing unit to capture an image upon reaching the second time point.

Still another aspect of the present disclosure provides, a non-transitory computer-readable storage medium comprising instructions for performing a method of controlling an image capturing apparatus, the method comprising: predicting to generate, by using an image of a first time point and being output from an image capturing unit, a prediction image predicting an image of a second time point in a future subsequent to the first time point; determining, about the prediction image, a degree of suitability indicating a degree of the prediction image being suitable as an image to be recorded; and controlling, in a case where the determined degree of suitability is higher than a predetermined threshold value, the image capturing unit to capture an image upon reaching the second time point.

According to the present invention, it becomes possible to automatically shoot at a suitable timing predicted from the current image.

Further features of the present invention will become apparent from the following description of exemplary embodiments (with reference to the attached drawings).

BRIEF DESCRIPTION OF THE DRAWINGS

FIGS. 2A and 2B are a view illustrating an exemplary configuration of an image prediction unit according to the present embodiment;

FIG. 6 is a view illustrating an example of a shooting reservation management table according to the present embodiment;

DESCRIPTION OF THE EMBODIMENTS

Figure 1:
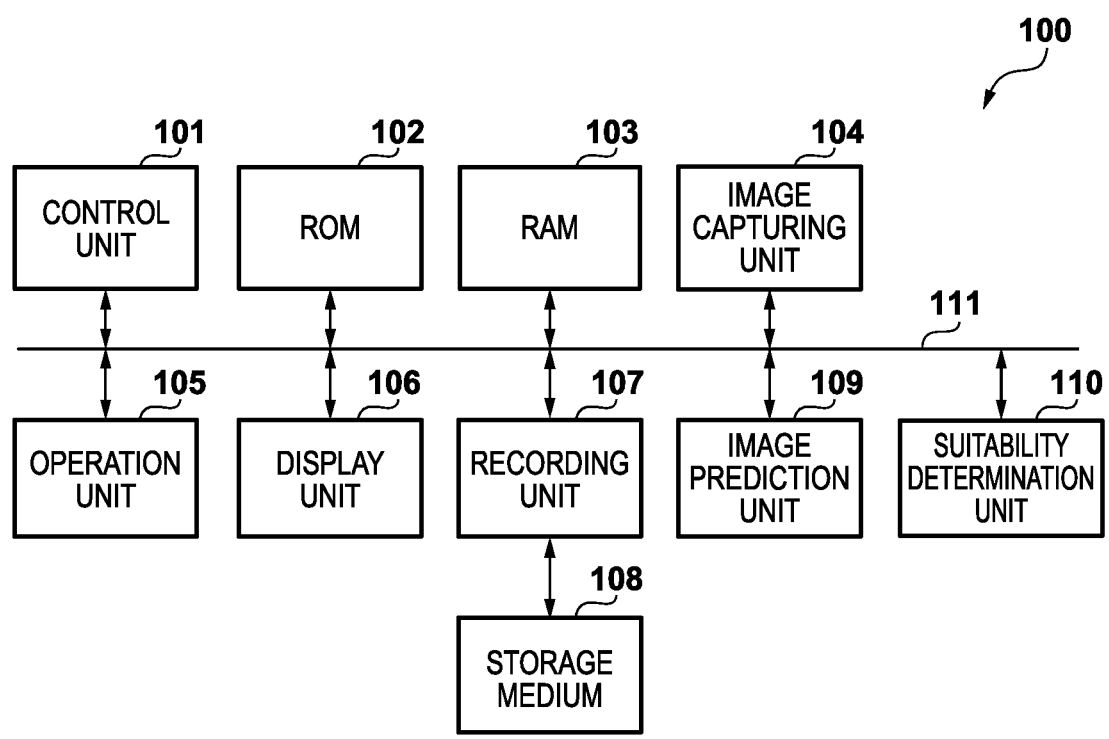
FIG. 1 is a block diagram illustrating an exemplary configuration of a camera as an example of an image capturing apparatus according to the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

As an example of an image capturing apparatus, there will be described an example of using a camera that can automatically shoot at a suitable timing using a machine learning model. However, the present embodiment is not limited to a camera, and is also applicable to any other device that can automatically shoot at a suitable timing using a machine learning model.

<Configuration of Camera>

An exemplary functional configuration of a camera 100 as an example of the image capturing apparatus according to the present embodiment will be described, referring to FIG. 1. Here, one or more of the functional blocks illustrated in FIG. 1 may be realized by hardware such as an ASIC or a programmable logic array (PLA), or may be realized by executing software by a programmable processor such as a CPU or a GPU. The functional blocks may also be realized by combination of software and hardware. Accordingly, in the following description, a same hardware can be realized as the main entity in a case where a different functional block is described as the operating entity.

A reference numeral 101 indicates a control unit. The control unit 101, including for example one or more processors such as CPUs, controls operation of the camera 100 as a whole by loading and executing programs stored in a ROM 102 or a storage medium 108. The control unit 101 may further include a GPU. In addition, the control unit 101 includes a hardware timer (also referred to as a timer function) for performing shooting reservation. As will be described below, the control unit 101 determines whether or not a prediction image output from an image prediction unit 109 satisfies a predetermined condition, based on the output from a suitability determination unit 110, or sets a shooting reservation at a future time point of the prediction image.

A reference numeral 102 indicates a Read Only Memory (ROM), including a non-volatile semiconductor memory, for example. The ROM 102 stores a control program to be executed by the control unit 101.

A reference numeral 103 indicates a Random Access Memory (RAM), the RAM 103 including a volatile semiconductor memory, for example. The RAM 103 is used by the control unit 101 as a work memory for executing a program, or a temporary storage area of various types of data.

A reference numeral 104 indicates an image capturing unit, the image capturing unit 104 including image capturing elements such as, for example, an image capturing lens, a diaphragm, a shutter, a CMOS sensor or the like, and an A/D converter or the like. The image capturing unit 104 converts analog signals input via the image capturing lens into digital data to acquire image data. The image data is stored in the RAM 103.

The image capturing unit 104 generates a Live View image (also referred to as an LV image) being shot by the camera, and still image data for recording. The LV image is YUV-format image data which is sequentially output from the image capturing unit 104 at a predetermined frame rate during a shooting operation, and displayed on a display unit 106 in real time. In addition, the LV image is also input to the image prediction unit 109. The still image data to be recorded is high-resolution image data generated according to the user's shooting instruction, and is recorded in the storage medium 108 via a recording unit 107. Since the still image data for recording has a high resolution, it is compressed in a JPEG format, for example.

A reference numeral 105 indicates an operation unit. The operation unit 105 receives a user operation and notifies the control unit 101 of the input information. The operation unit 105 may include at least any of a touch panel, buttons, switches, and cross keys, for example.

A reference numeral 106 indicates a display. The display unit 106 is a processing unit that displays, to the user, information relating to the state of the camera 100, live view images generated by the image capturing unit 104, image data recorded in the storage medium 108, or the like. The display unit 106 includes a liquid crystal panel or an LED, for example.

A reference numeral 107 indicates a recording unit. The recording unit 107 controls reading and writing of data from and to the storage medium 108. The recording unit 107 controls initialization of the storage medium 108, and data transfer between the storage medium 108 and the RAM 103.

A reference numeral 108 indicates a storage medium. The storage medium 108, which is a device including a large-capacity storage area, includes a memory card or a flash memory, for example. The storage medium 108 may store a control program to be executed by the control unit 101.

A reference numeral 109 indicates an image prediction unit. The image prediction unit 109 forms an image prediction model. The image prediction unit 109 may be realized by a circuit or a processor for executing processing of the image prediction model, or may be realized by software to be executed by the control unit 101 for processing of the image prediction model. The image prediction unit 109 inputs an image and generates a prediction image that is at a future time point of the image.

A specific example of the configuration of the image prediction unit 109 will be described, referring to FIG. 2A. As illustrated in FIG. 2A, the image prediction unit 109 includes a configuration in which a plurality of prediction units 202 are coupled. The image prediction unit 109, upon receiving an input of an image 201, performs processing of the image prediction model, and outputs a plurality of prediction images 203. The prediction unit 202 generates and outputs a prediction image corresponding to a next time point of an input image shot at a certain time point. The prediction image is an image generated by using an image shot at a certain time point (first time point) to predict how a subject or a background will be shot at a timing of a time point (second time point) next to the first time point. In addition, the prediction unit 202, having received input of the prediction image, generates a prediction image subsequent to the next time point. As such, the image prediction unit 109 generates as many prediction images as the number of the coupled prediction units 202.

FIG. 2B illustrates a specific example of a configuration of each prediction unit 202. The prediction unit 202, which is formed of neural network, for example, includes a convolutional network 204 that extracts feature information of an input image, and a recurrent neural network 205 that stores a past state to infer a next state. The convolutional network 204 may be similar to a network that forms a Convolutional Neutral Network (CNN) known as a deep learning technique for image recognition. The convolutional network 204 is a neural network that performs a convolution process for condensing feature points of the image using a filter, and a pooling process for reducing the amount of information of image data while maintaining information of critical feature points. The recurrent neural network 205 is a network including recurrent connections for storing a state in a hidden layer (also referred to as an intermediate layer) within the recurrent neural network 205, as illustrated in FIG. 2B. The recurrent neural network 205 may use recurrent connections to take into account features associated with time series changes, and generates a future prediction image based on past images. In addition, the recurrent neural network 205 can use an Long Short-Term Memory (LSTM), for example, which is known as a recurrent neural network suitable for long-term storage. Here, other configurations may be used. Provided that they can generate, based on an image shot at a certain time point, a prediction image of the timing at a time point next to the certain time point. In addition, the neural network of the prediction unit 202 can be trained using training data including an image of a first time point of a video as an input image, and an image of a second time point, i.e., the timing at a next time point in the video as the correct answer data, for example.

Figure 3:
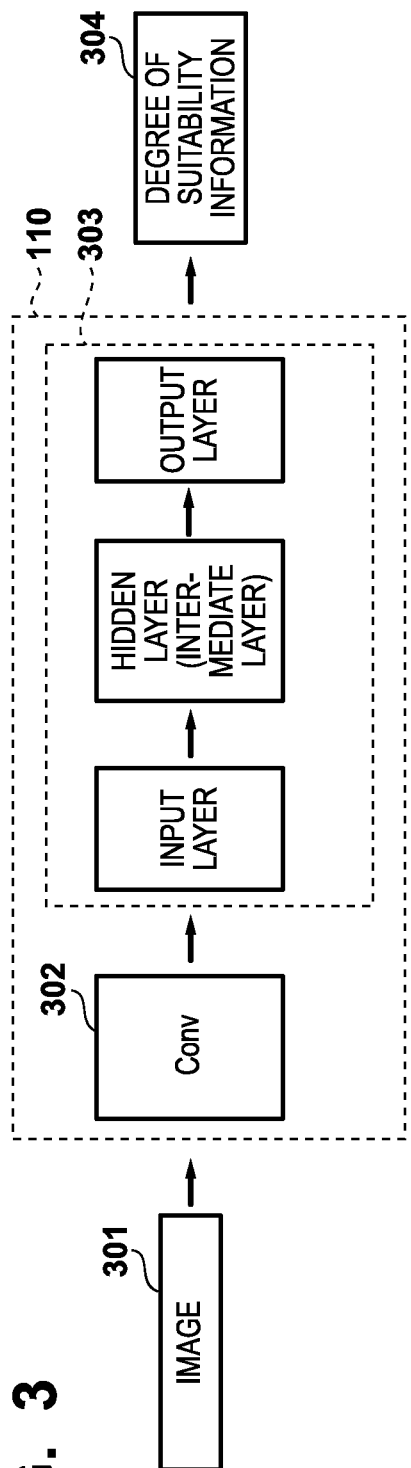
FIG. 3 is a view illustrating an exemplary configuration of a suitability determination unit in the present embodiment.

A reference numeral 110 indicates a suitability determination unit. Upon receiving input of an image, the suitability determination unit 110 determines the degree of suitability of the image for shooting and recording. Here, degree of suitability information is information indicating whether or not an input image is suitable as an image to be recorded (also referred to as a recording image), that is, a degree of whether or not the recording image will be accepted by the user. The suitability determination unit 110 may be realized by a circuit or a processor for executing a process of determining the degree of suitability of shooting and recording, or may be realized by software to be executed by the control unit 101 for a determination process of the degree of suitability. Referring to FIG. 3, an exemplary configuration of a suitability determination unit 110 will be described. The suitability determination unit 110 may be formed using the CNN described above. The suitability determination unit 110 includes a convolutional network 302 that extracts feature information of an input image 301, and a degree of suitability determination network 303 on which a training process has been preliminarily performed using a large number of images having a high degree of suitability as training data. The configuration of the convolutional network 302 is similar to that of the convolution network 205 described above. The degree of suitability determination network 303, which is a network forming a forward propagation type fully connected layer in the hidden layer, outputs degree of suitability information 304 at the output layer, as a result of classification of the degree of suitability based on feature information. The training data may include, for example when shooting figure skating, data provided with a high degree of suitability to an image in which the skater's face is facing forward at the apex of jump, and data provided with a lower degree of suitability to an image of a state in which the skater is starting to jump or an image in which the skater's face is not facing forward. The training data is not limited to the example of figure skating, and may include images provided with a high or low degree of suitability for a variety of sports or shooting scenes.

For example, the control unit 101 determines whether or not a prediction image is a suitable prediction image as a recording image, based on the degree of suitability information output from the suitability determination unit 110. In addition, the control unit 101 sets a shooting reservation at a future time point of a prediction image determined to be suitable as a recording image.

A reference numeral 111 indicates an internal bus connecting control signals exchanged between respective processing units described above.

<Outline of Automatic Shooting Process>

Next, there will be described an outline of a process from generating an LV image to performing automatic shooting (also simply referred to as automatic shooting process) according to the present embodiment. The automatic shooting process according to the present embodiment is intended to be used as a shooting assist function, as an example. For example, let us consider a case of applying the automatic shooting process for shooting figure skating. Inclusion of a skater now trying a jump in an LV video allows for automatically shooting at a timing when the skater reaches the apex of the jump and is facing forward, i.e., a suitable timing for shooting.

Figure 4:
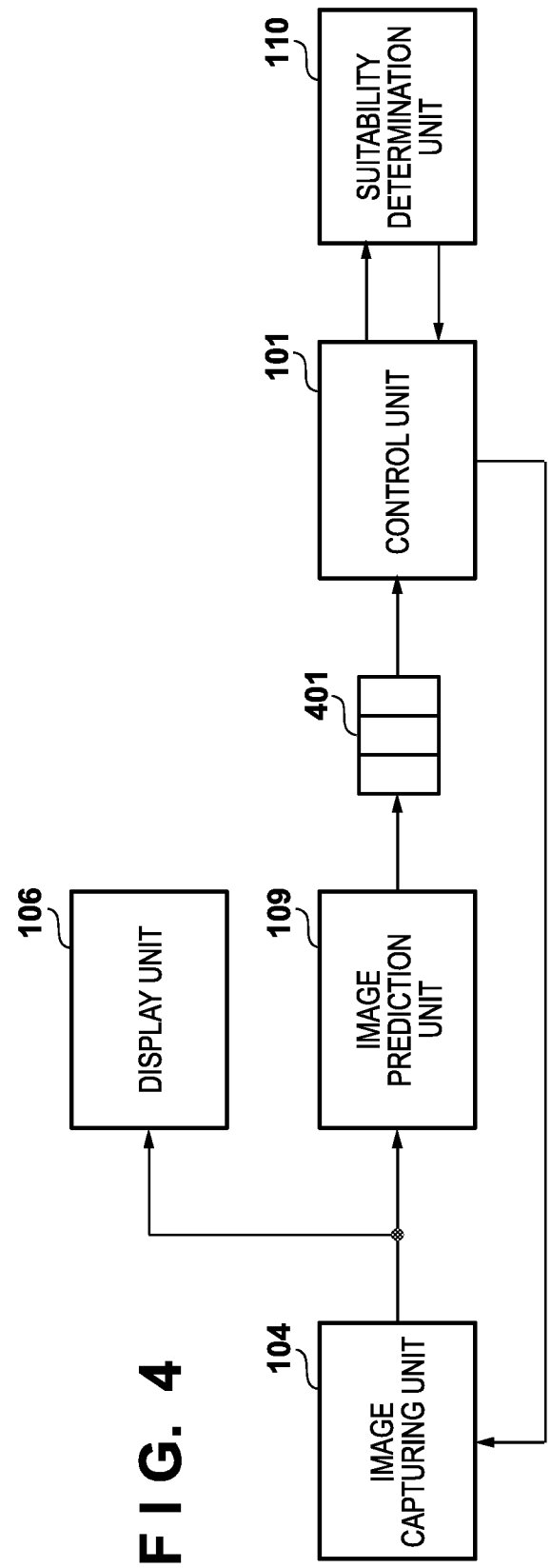
FIG. 4 is a view illustrating a data flow from LV image generation to automatic shooting according to the present embodiment.

In the following, an outline of the automatic shooting processing will be described, referring to FIG. 4. The image capturing unit 104 generates an LV image at a regular time interval while the image capturing unit 104 is operating, and transmits the generated LV image to the display unit 106 and the image prediction unit 109. In the present embodiment, it is assumed as an example that LV images are generated as YUV data with a resolution of 800×600 at a speed of 20 frames per second (50-millisecond interval). The display unit 106 displays, in real time, the LV images being transmitted.

The image prediction unit 109 generates prediction images of a plurality of future time points, based on the input LV image, and stores the generated prediction images in a prediction image buffer 401. The prediction image buffer 401 is a memory area for temporarily storing the prediction images to be arranged in a part of the RAM 103.

Figure 5:
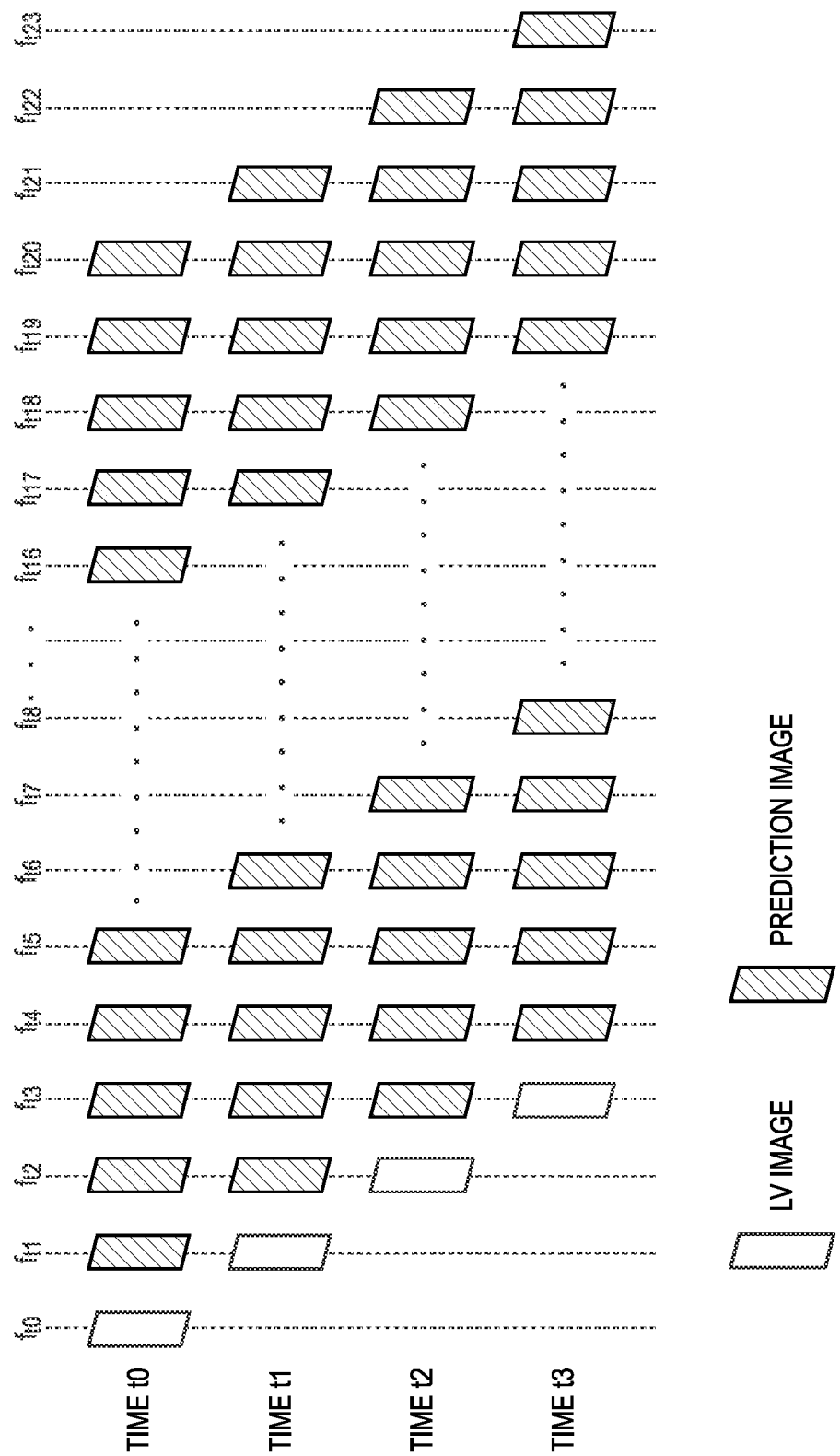
FIG. 5 is a view illustrating a relation between generated prediction images and time points in the present embodiment.

Here, the image prediction unit 109 in the present embodiment is assumed to include 20 prediction units 202, as an example. The image prediction unit 109 uses LV images being input at a 50-millisecond interval to generate prediction images up to at most a one-second future (50 milliseconds×20). For example, the relation between prediction images generated by the image prediction unit 109 and time points is as illustrated in FIG. 5.

The image prediction unit 109 executes, at a time point t0, image prediction using an LV image $f_{t0}$, and generates prediction images $f_{t1}$ to $f_{t20}$ corresponding to future time points t1 to t20. Subsequently, at a next time point t1 after 50 milliseconds, the image prediction unit 109 executes image prediction using an LV image $f_{t1}$, and generates prediction images $f_{t2}$ to $f_{t21}$ corresponding to future time points t2 to t21. 20 prediction images are similarly generated at subsequent time points t2 and t3.

Next, the control unit 101 inputs, to the suitability determination unit 110, a prediction image stored in the prediction image buffer 401, and acquires degree of suitability information from the suitability determination unit 110. The control unit 101 determines, based on the degree of suitability information acquired from the suitability determination unit 110, whether or not to execute shooting and recording of the corresponding prediction image and, in a case where it is determined to execute shooting and recording, sets a shooting reservation for a corresponding future time point. Specifically, the control unit 101 executes a timer function so that the image capturing unit 104 executes shooting and recording according to a corresponding future time point, and records a prediction image, which is a subject for shooting reservation, and degree of suitability information thereof in the shooting reservation management table. The shooting reservation management table, which is stored in the storage medium 108, for example, is configured as the table illustrated in FIG. 6. The IDs illustrated in FIG. 6 are numbers for identifying respective shooting reservations, and may correspond to the order of shooting. A prediction image ID illustrated in FIG. 6 is information for identifying a prediction image which is to be a subject for shooting reservation, and is represented in a manner clarifying, for example, corresponding time point information. The time point information may be a relative time point with respect to the LV image, or may be an absolute time point. The degree of suitability illustrated in FIG. 6 is information indicating a degree of suitability of a prediction image which is a subject for shooting reservation, and is indicated by a percentage (%) of 100 stages, for example. The degree of suitability may be other numerical values such as decimal values between 0 to 1, for example, provided that it indicates a degree for whether or not an image being suitable as a recording image. The example illustrated in FIG. 6 illustrates a state in which three shooting reservations is set.

Here, a series of processing from image prediction to shooting reservation described above is executed to be finished within a generation cycle (e. g., 50 milliseconds) of an LV image, while ensuring real-time capability.

<A Series of Operations Related to Automatic Shooting Process>

Figure 7:
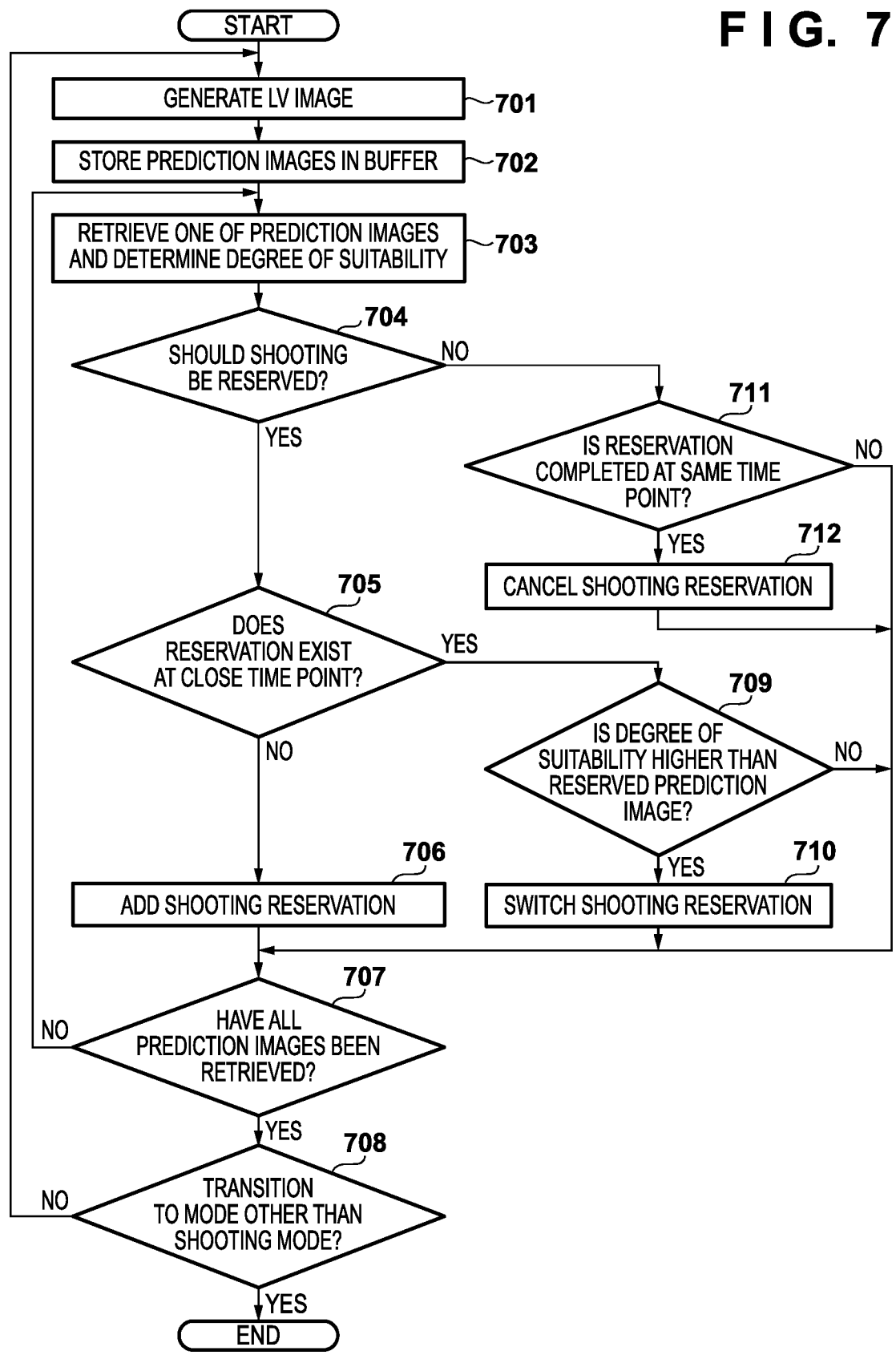
FIG. 7 is a flowchart illustrating a series of operations of automatic shooting process according to the present embodiment.

Next, a series of operations related to the automatic shooting process will be described, referring to FIG. 7, Note that, unless explicitly stated, the present process is realized by the control unit 101 deploying a program, which is stored in the ROM 102 or the storage medium 108, in a work area of the RAM 103, and executing. In addition, the present process is executed, with the machine learning model (neural network) in the image prediction unit 109 and the suitability determination unit 110 is in a state of being trained. Furthermore, the present process is started at a time point when, for example, a user operation on the operation unit 105 causes the operation mode of the camera 100 to transition to the shooting mode. Here, the shooting mode is one of the operation modes of the camera 100, and is an operation mode that allows the user to shoot a still image at any moment by pressing a shoot-and-record button. For example, the foregoing excludes an operation mode that playback displays, on a liquid crystal monitor, a still image recorded in the memory card without activating the shooting function.

At S701, the image capturing unit 104 generates an LV image for a single frame, and outputs the LV image to the image prediction unit 109. At S702, the image prediction unit 109 generates prediction images corresponding to a plurality of future time points based on the LV image output from the image capturing unit 104, and stores the generated prediction images in the prediction image buffer 401. Upon storing the generated images in the image buffer 401, the image prediction unit 109 notifies the control unit 101. At S703, the control unit 101 retrieves one of the prediction images from the prediction image buffer 401, inputs the retrieved image to the suitability determination unit 110, and acquires corresponding degree of suitability information from the suitability determination unit 110.

At S704, the control unit 101 uses the degree of suitability information acquired from the suitability determination unit 110 to determine whether or not to execute shooting reservation. For example, the control unit 101 determines to execute shooting reservation of the corresponding prediction image in a case where the degree of suitability is higher than a predetermined threshold value. The predetermined threshold value may be 70% or the like, for example. In a case where the degree of suitability is higher than the predetermined threshold value, the control unit 101 determines to execute shooting reservation and proceeds to S705. In a case where the degree of suitability is equal to or lower than the predetermined threshold value, the control unit 101 determines not to execute shooting reservation and proceeds to S711.

At S705, the control unit 101 determines whether or not another shooting reservation exists at a time point close to the future time point determined to be reserved. For example, the control unit 101 refers to the shooting reservation management table in the storage medium 108 and determines whether or not another shooting reservation has already been set at a time point close to the future time point determined to be reserved at S704. The control unit 101 proceeds to S709 upon determining that a shooting reservation has been set, or proceeds to S706 upon determining that no shooting reservation has been set. Here, the state in which another shooting reservation has already been set at a close time point refers to a state in which the time interval between two reservations is narrower than a predetermined time range and is therefore shorter than the time required for shoot-and-record processing per one image, for example, whereby it is impossible to enable both shooting reservations. In the present embodiment, the time required for shoot-and-record processing per one image is assumed to be 200 milliseconds, as an example. In this case, the determination of whether or not another shooting reservation has been set at a close time point is a determination of whether or not another shooting reservation is within 200 milliseconds before and after. As such, determining an overlap of shooting reservations allows for avoiding any shooting reservation to be set that is difficult to actually execute.

Figure 8:
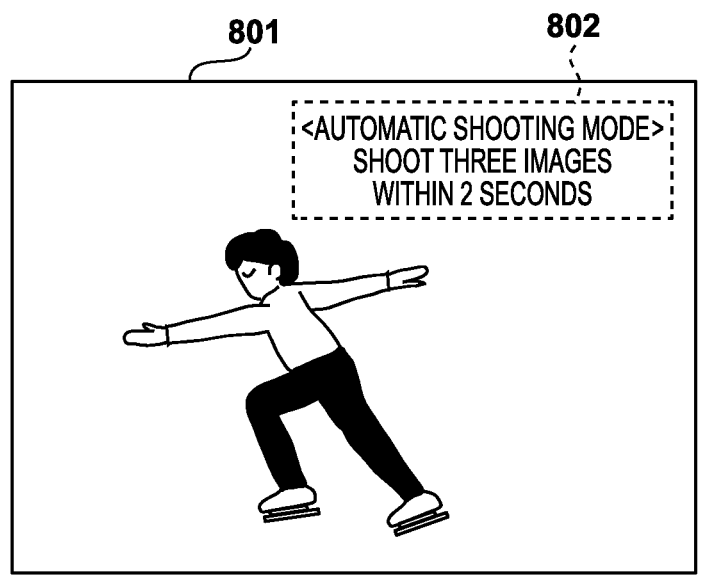
FIG. 8 is a view illustrating an example of a display screen of notification information according to the present embodiment.

At S706, the control unit 101 sets the shooting reservation determined to be reserved at S704. Specifically, the control unit 101 executes the timer function to cause the image capturing unit 104 to execute shooting and recording at a corresponding future time point, and adds the prediction image, to which shooting reservation is performed, and the degree of suitability information thereof to the shooting reservation management table of the storage medium 108. Additionally, at the present step, the control unit 101 displays, on the display unit 106, information notifying that a shooting reservation has been set (that automatic shooting is being performed) in the camera 100, in order to alert the user to continue capturing of the subject by the image capturing unit 104. For example, the screen indicating that the camera is performing automatic shooting may be the screen 801 illustrated in FIG. 8. The reference numeral 801 indicates the entire screen, whereas 802 indicates notification information displayed by the present step. The notification information 802 includes, for example, information indicating that the shooting reservation has been set (that automatic shooting is being performed), and information indicating the duration of automatic shooting and the number of images to be automatically shot. The notification information 802 may be configured using information of the shooting reservation management table. Although an example of displaying text information as the notification information 802 is illustrated in FIG. 8, the notification information is not limited to text and may be indicated as an icon, or may be notified by sound.

At S707, the control unit 101 determines whether or not all the prediction images stored in the prediction image buffer 401 at S702 have been retrieved at S703. Upon determining that all the prediction images stored in the prediction image buffer 401 have been retrieved, the control unit 101 proceeds to S708. Upon determining that not all the prediction images stored in the prediction image buffer 401 have been retrieved, the control unit 101 returns to S703 again.

At S708, the control unit 101 determines whether or not the operation mode of the camera 100 is changed from the shooting mode to another mode by the user. In a case where the mode is changed to another mode, the flowchart is terminated. In a case where the shooting mode is continued, the process returns to S701 again.

At S709, the control unit 101 performs processing for the case where a shooting reservation exists at a close time point. Specifically, the control unit 101 refers to the shooting reservation management table and determines whether or not the degree of suitability of the prediction image determined at S704 to be reserved is higher than the degree of suitability of the prediction image for which it is detected at S705 that its shooting has been reserved at a close time point. Upon determining that the degree of suitability of a new prediction image determined to be reserved is higher than that of the already set prediction image, the control unit 101 proceeds to S710, otherwise the control unit 101 terminates the processing of the shooting reservation that has been determined to be reserved at 704, and proceeds to S707.

At S710, the control unit 101 cancels the already set shooting reservation detected at S705, and newly sets a shooting reservation determined to be reserved at S704. Here, in order to cancel the shooting reservation, the control unit 101 terminates the corresponding timer function and also deletes the corresponding reservation information from the shooting reservation management table. The setting process of shooting reservation is similar to the setting process of shooting reservation described at S706. As such, in a case where temporally proximate prediction images exist, prioritizing the shooting reservation of a prediction image having a higher degree of suitability allows for acquiring an image that is more advantageous for the user by automatic shooting.

At S711, the control unit 101 determines whether or not a shooting reservation has already been set at a same time point as the future time point determined at S704 not to reserve shooting. The control unit 101 proceeds to S712 upon determining, by referring to the shooting reservation management table of the storage medium 108, that a shooting reservation has already been set at a same time point as the future time point determined at S704, or otherwise proceeds to S707.

At S712, the control unit 101 cancels the already set shooting reservation detected at S711. The content of cancellation process of shooting reservation is similar to the content of cancellation process of shooting reservation described at S710. On this occasion, the control unit 101, with the cancellation of the shooting reservation, updates at this step the display of notification information which has been started at S706. Alternatively, the control unit 101 may display information notifying the cancellation of shooting reservation on the display unit 106. Upon deleting the shooting reservation (in a case where all the shooting reservations are canceled), the control unit 101 may erase the display of notification information started at S706. At S711 and S712, an existing shooting reservation can be canceled in a case where a future time point, although determined to be suitable for shooting and recording in image prediction of a previous LV image, is determined to be unsuitable in image prediction of a subsequent LV image. Subsequently, the control unit 101 executes S707 and S708 as described above, and terminates the series of operations of the automatic shooting process.

Here, the aforementioned embodiment has described, as an example, a case where the number of the suitability determination units 110 to be included in the camera 100 is one. However, the number of the suitability determination units 110 is not limited thereto, and the camera 100 may be configured to be able to control a plurality of suitability determination units 110. Although configuring the plurality of suitability determination units 110 increases the size of the system configuration, it becomes possible to execute suitability determination processes on the plurality of prediction images simultaneously in parallel, whereby the overall processing time can be reduced. Note that using this method allows for increasing the number of prediction images to be output from the image prediction unit 109. Accordingly, it becomes possible to execute image prediction for a further future time point.

In addition, the aforementioned embodiments have been described, taking as an example of a case where the image prediction unit 109 and the suitability determination unit 110 are formed by a neural network. In the case of using the image prediction unit 109 or the suitability determination unit 110 including a neural network that requires a large amount of calculation, there may be further implemented a mechanism for reducing the processing load. For example, after one shooting reservation has been set by the control unit 101, the control unit 101 may not set a new shooting reservation until shooting and recording is executed according to the shooting reservation, or until the shooting reservation is canceled. Then, the control unit 101 may perform only adjustment of the time point of the already set shooting reservation. For example, the control unit 101 may cause the suitability determination unit 110 to execute the degree of suitability determination process only on a prediction image of a time point close to the time point of shooting reservation, instead of executing on all the prediction images generated by the image prediction unit 109. Here, the time point close to the time point of shooting reservation may be, for example, a time point within 300 milliseconds before and after the time point of shooting reservation. As such, limiting the time point that is to be a subject time for shooting reservation allows for reducing the processing load of the suitability determination unit 110, and therefore reducing power consumption of the entire camera 100 associated therewith.

As has been described above, the present embodiment generates, by using an image of a first time point which is output from the image capturing unit 104, a prediction image predicting an image of a second time point in a future subsequent to the first time point. Subsequently, a degree of suitability of the generated prediction image (degree of the prediction image being suitable as an image to be recorded) is determined and, in a case where the determined degree of suitability is higher than a predetermined threshold value, the image is to be captured upon reaching the second time point. The foregoing allows for automatically shooting at a suitable timing predicted from the current image. In other words, it becomes possible to realize a system that predicts a future image suitable for shooting from a current LV image and automatically shoots an image, using an image prediction model. In addition, the present embodiment, after having set a shooting reservation at a future time point, cancels the shooting reservation in a case where it is determined that shooting at the time point is not suitable according to a subsequently generated LV image. The foregoing allows for adjusting a future time point at which a shooting reservation has once been set into an appropriate shooting timing each time an LV image is generated, i.e., as the current time point approaches the reserved future time point.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-081834, filed May 13, 2021 which is hereby incorporated by reference herein in its entirety.

What is claimed is:

1. An image capturing apparatus comprising:
   at least one processor programmed to perform operations of following units;
   a prediction unit configured to generate, by using an image of a first time point and being output from an image capturing unit, a prediction image predicting an image of a second time point in a future subsequent to the first time point;
   a determination unit configured to determine, about the prediction image, a degree of suitability indicating a degree of the prediction image being suitable as an image to be recorded; and
   a control unit configured to control, in a case where the determined degree of suitability is higher than a predetermined threshold value, the image capturing unit to capture an image upon reaching the second time point,
   wherein the control unit sets a shooting reservation for capturing an image upon reaching the second time point, in a case where the determined degree of suitability is higher than the predetermined threshold value;
   wherein the control unit, after a first shooting reservation is set for capturing the image of the second time point based on the image of the first time point, determines whether or not the degree of suitability of the prediction image generated using an image of a third time point subsequent to the first time point is higher than the degree of suitability of the prediction image generated using the image of the first time point; and
   wherein the control unit cancels the first shooting reservation and sets a second shooting reservation based on the image of the third time point, in a case where the degree of suitability of the prediction image generated using the image of the third time point is higher than the degree of suitability of the prediction image generated using the image of the first time point.

2. The image capturing apparatus according to claim 1, wherein the prediction unit includes a machine learning model that generates the prediction image corresponding to a time point in a future subsequent to the first time point based on the image of the first time point.

3. The image capturing apparatus according to claim 1, wherein the determination unit includes a machine learning model that determines the degree of suitability of an image being input.

4. The image capturing apparatus according to claim 1, wherein the image of the first time point is a live-view image being sequentially output from the image capturing unit.

5. The image capturing apparatus according to claim 1, wherein the control unit, in response to setting the shooting reservation, causes a display unit to display information notifying that the shooting reservation is set.

6. The image capturing apparatus according to claim 1, wherein the control unit, after having set a first shooting reservation for capturing the image of the second time point based on the image of the first time point, cancels the first shooting reservation, in a case where the degree of suitability of the prediction image of the second time point or within a predetermined time range from the second time point is equal to or lower than the predetermined threshold value, the prediction image having been generated using an image of a third time point subsequent to the first time point.

7. The image capturing apparatus according to claim 1, wherein the control unit, in response to having canceled the first shooting reservation, causes a display to display information notifying that the shooting reservation is canceled, or changes the information notifying that the shooting reservation is set.

8. The image capturing apparatus according to claim 6, wherein the predetermined time range is a time period required for outputting an image from the image capturing unit and recording the image in a storage medium.

9. The image capturing apparatus according to claim 1, wherein
   the prediction unit outputs prediction images of a plurality of time points in a future subsequent to the first time point; and
   the control unit controls the image capturing unit to capture an image in a case where a time point has been reached for a prediction image that has the degree of suitability being higher than the predetermined threshold value, among the degree of suitability determined for each of the prediction images of the plurality of time points.

10. The image capturing apparatus according to claim 6, wherein, the determination unit, in response to having set the shooting reservation, determines the degree of suitability only for the prediction image of a time point within a predetermined time range from the time point at which the shooting reservation is set, among the prediction images of the plurality of time points.

11. The image capturing apparatus according to claim 1, further comprising a recorder configured to record, in a storage medium, an image captured upon reaching the second time point.

12. A method of controlling an image capturing apparatus, the method comprising:

predicting to generate, by using an image of a first time point and being output from an image capturing unit, a prediction image predicting an image of a second time point in a future subsequent to the first time point;

determining, about the prediction image, a degree of suitability indicating a degree of the prediction image being suitable as an image to be recorded; and controlling, in a case where the determined degree of suitability is higher than a predetermined threshold value, the image capturing unit to capture an image upon reaching the second time point;

wherein the controlling step further comprises:

setting a shooting reservation for capturing an image upon reaching the second time point, in a case where the determined degree of suitability is higher than the predetermined threshold value;

after a first shooting reservation is set for capturing the image of the second time point based on the image of the first time point, determining whether or not the degree of suitability of the prediction image generated using an image of a third time point subsequent to the first time point is higher than the degree of suitability of the prediction image generated using the image of the first time point; and cancelling the first shooting reservation and setting a second shooting reservation based on the image of the third time point, in a case where the degree of suitability of the prediction image generated using the image of the third time point is higher than the degree of suitability of the prediction image generated using the image of the first time point.

13. A non-transitory computer-readable storage medium comprising instructions for performing a method of controlling an image capturing apparatus, the method comprising:

predicting to generate, by using an image of a first time point and being output from an image capturing unit, a prediction image predicting an image of a second time point in a future subsequent to the first time point;

determining, about the prediction image, a degree of suitability indicating a degree of the prediction image being suitable as an image to be recorded; and controlling, in a case where the determined degree of suitability is higher than a predetermined threshold value, the image capturing unit to capture an image upon reaching the second time point;

wherein the controlling step further comprises:

setting a shooting reservation for capturing an image upon reaching the second time point, in a case where the determined degree of suitability is higher than the predetermined threshold value;

after a first shooting reservation is set for capturing the image of the second time point based on the image of the first time point, determining whether or not the degree of suitability of the prediction image generated using an image of a third time point subsequent to the first time point is higher than the degree of suitability of the prediction image generated using the image of the first time point; and cancelling the first shooting reservation and setting a second shooting reservation based on the image of the third time point, in a case where the degree of suitability of the prediction image generated using the image of the third time point is higher than the degree of suitability of the prediction image generated using the image of the first time point.

* * * * *